(12) United States Patent
Paloniemi et al.

(10) Patent No.: US 7,787,666 B2
(45) Date of Patent: Aug. 31, 2010

(54) SENSING DATA INPUT

(75) Inventors: Jari Paloniemi, Kiiminki (FI); Timo Kinnunen, Paavola (FI); Vesa Ulvinen, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 1435 days.

(21) Appl. No.: 09/738,710

(22) Filed: Dec. 15, 2000

(65) Prior Publication Data

US 2001/0017934 A1   Aug. 30, 2001

(30) Foreign Application Priority Data

Dec. 17, 1999 (GB) ................. 9929952.1

(51) Int. Cl.
*G06K 9/00* (2006.01)
*G05B 19/00* (2006.01)

(52) U.S. Cl. ..................... 382/124; 340/5.83

(58) Field of Classification Search ................ 382/107, 382/115, 116, 124
See application file for complete search history.

(56) References Cited

U.S. PATENT DOCUMENTS

| | | | |
|---|---|---|---|
| 605,754 A | 6/1898 | Shuman | |
| 4,546,347 A | 10/1985 | Kirsch | |
| 5,218,174 A | 6/1993 | Gray et al. | 178/19 |
| 5,578,817 A | 11/1996 | Bidiville et al. | |
| 5,801,681 A | 9/1998 | Sayag | |
| 5,864,296 A | 1/1999 | Upton | |
| 6,289,114 B1 * | 9/2001 | Mainguet | 382/124 |
| 6,333,989 B1 * | 12/2001 | Borza | 382/124 |
| 6,392,636 B1 * | 5/2002 | Ferrari et al. | 345/173 |
| 6,408,087 B1 * | 6/2002 | Kramer | 382/124 |

FOREIGN PATENT DOCUMENTS

| | | |
|---|---|---|
| EP | 0905646 A1 | 3/1999 |
| EP | 0929028 A2 | 7/1999 |
| EP | 0973123 A1 | 1/2000 |
| GB | 2312040 | 10/1997 |
| JP | 1993-061966 | 3/1993 |
| JP | 1999-212689 | 8/1999 |
| JP | 11 345076 | 12/1999 |
| WO | WO 98/58346 | 12/1908 |
| WO | WO 97/29477 | 8/1997 |
| WO | 9858342 | 12/1998 |
| WO | WO 98/58346 | 12/1998 |
| WO | WO 99/27485 | 6/1999 |

OTHER PUBLICATIONS

Japanese Patent document No. JP 110212689 (English Translation of the Abstract is attached).

(Continued)

*Primary Examiner*—Charles Kim
(74) *Attorney, Agent, or Firm*—Perman & Green, LLP

(57) ABSTRACT

A user input device includes a sensor capable of sensing surface relief of human skin, a movement detector responsive to variation of the output of the sensor for detecting movement of skin across the sensor, and a user interface apparatus responsive to the movement detector to alert its state in correspondence to the detected movement.

10 Claims, 4 Drawing Sheets

OTHER PUBLICATIONS

Japanese Patent document No. JP 100275233 (English Translation of the Abstract is attached).

Japanese Patent document No. JP 100240435 (English Translation of the Abstract is attached).

Japanese Patent document No. JP 040158434 (English Translation of the Abstract is attached).

European Examination Report dated Oct. 5, 2006.

Chinese Office Action dated Aug. 8, 2003.

Japanese Office Action dated Jul. 7, 2009.

* cited by examiner

SENSING DATA INPUT

FIELD OF THE INVENTION

This invention relates to sensing data input, especially sensing input of movement and/or pointing data by means of a sensor such as a fingerprint sensor.

BACKGROUND OF THE INVENTION

One important way of making electronic equipment easier to use is to make operation of the equipment's user interface more intuitive. To this end, many electronic devices have graphical and/or menu-driven user interfaces. In those user interfaces options are displayed on a screen and can be scanned through or selected on the basis of the movement of a pointer. The pointer may be a cursor which is displayed, or may be a virtual pointer which is not displayed but can be considered by a user to be conceptually linked to the operation of the display (for example in the scrolling of a menu list). Input means is then provided for detecting inputs from a user that can cause movement of the pointer. Such input means preferably detect physical movement of part of the user's body, whereupon the pointer can be caused to move in a corresponding way. A number of types of such input means are currently preferred. For detecting motion in one dimension there are rotatable wheels or rollers linked to rotation sensors. For detecting motion in two dimensions there are mice and trackballs including multiple rotation sensors, trackpoints having multiple force sensors, joysticks having multiple sensors for detecting angular deflection, and touchpads which can determine the location of a pressure source such as a fingertip within the boundaries of the touchpad and over time establish the motion of the pressure source within those boundaries. An array of buttons or keys, suitably marked with direction arrows, can also be used.

These forms of motion detection all have disadvantages, especially for highly portable equipment such as mobile telephones. Where equipment is intended to be highly portable it is greatly desirable that it is small and light-weight and, to improve reliability, that it has no moving parts. Wheels, rollers, trackballs, mice and joysticks must be large enough to be conveniently engaged by a user's hand and have moving parts and rotation or other detectors that are easily disrupted by dirt that can accumulate during use. Dirt is a particular risk for items such as mobile telephones that are carried continually and often exposed to dusty or dirty environments. Trackpoints are highly compact but are difficult for some users to operate because the user's finger engaged on the trackpoint does not change position significantly during use. Touchpads can be found to be easier to operate because the user's finger must move across the surface of the touchpad in order to provide an input. Touchpads have therefore become popular for large-sized items of portable equipment such as laptop computers. However, touchpads are generally unsuitable for smaller devices such as modern mobile telephones because of the space needed to provide room on the touchpad for a finger to be able to be moved within its boundaries. With a touchpad, sensed movement is dependant principally on the location of pressure on the pad. Buttons and keys occupy a relatively large amount of space on a device and are less intuitive for users to operate than are other more tactile input means. Also, joysticks, mice, rollers and rollerballs are not capable of conveniently sensing rotating motion.

There is therefore a need for an improved means for control of user interfaces.

SUMMARY OF THE INVENTION

According to one aspect of the present invention there is provided a user input device comprising: a sensor capable of sensing surface relief of human skin; a movement detector responsive to variation of the output of the sensor for detecting movement of skin across the sensor; and user interface apparatus responsive to the movement detector to alter its state in correspondence to the detected movement.

According to another aspect of the present invention there is provided a method of operation in a user input device comprising a sensor capable of sensing surface relief of human skin, the method comprising: detecting movement of skin over the sensor; and altering the state of user interface apparatus in response to the detected movement.

The sensor suitably comprises a plurality of sensing units. The sensing units are preferably arranged in a substantially planar array. The sensing units may be optical sensing units or sensing units of another type. The sensor may be a fingerprint sensor. The sensor is preferably capable of detecting surface relief of a depth of 1 or 2 µm or less.

The movement detector is preferably responsive to variation of the output of the sensor for determining the direction of movement of skin over the sensor. Most preferably the sensor comprises a first sensing section extending in a first direction and a second sensing section extending in a second direction. One or both of the sensing sections may comprise a linear arrangement of sensing units. The first and second directions are preferably orthogonal. The movement detector is preferably operable to compare successive outputs from the first sensing section to detect movement in the first direction and to compare successive outputs from the second sensing section to detect movement in the second direction. The movement detector is preferably operable to determine a composite direction of movement over the sensor from combination of detected movement in the first and second directions. The movement detector is preferably operable to detect movement by detecting changes over time in the relief detected by parts of the sensor.

The device suitably comprises storage apparatus capable of storing successive outputs from the sensor in a memory so as to form a record of the surface relief of skin drawn over the sensor. That record may represent a fingerprint scan.

The user interface apparatus may include a display and a display controller capable of controlling the display so as to cause at least part of an image to move over the display in correspondence to detected movement over the sensor. The said at least part of an image may be a cursor, and icon or one or more menu options. The display controller may be capable of controlling the display so as to cause the said at least part of an image to move over the display in apparently the same direction as the detected movement over the sensor. For example, if the sensor is in substantially the same plane as the display then those directions of movement may be substantially the same.

BRIEF DESCRIPTION OF THE DRAWINGS

The present invention will now be described by way of example with reference to the accompanying drawings, in which.

DESCRIPTION OF THE PREFERRED EMBODIMENT

Figure 1:
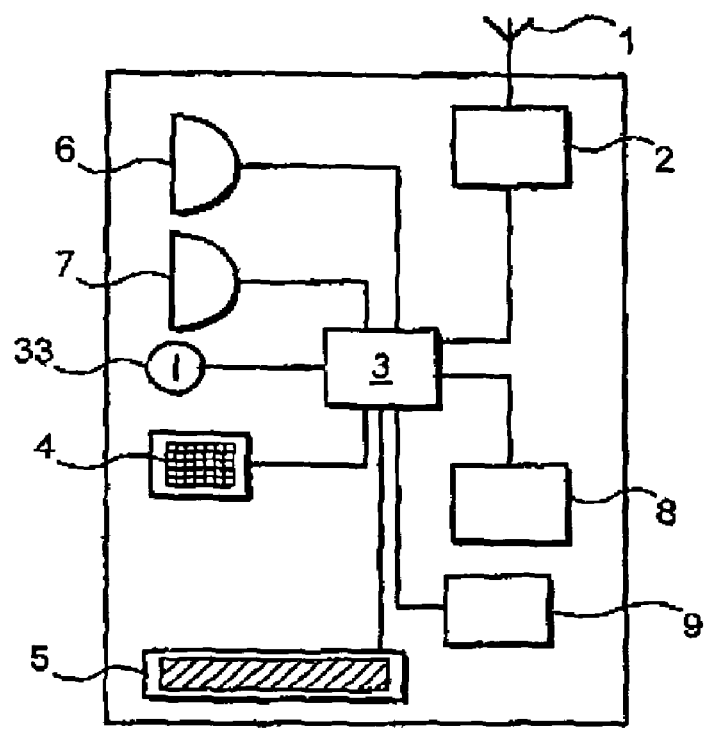
FIG. 1 shows schematically the architecture of a communication terminal.

The communication terminal of FIG. 1 includes a fingerprint sensor 5 which is capable of sensing the surface relief of an object over it. The fingerprint sensor is connected to detector circuitry 12 which is capable of detecting the direction of motion of an object across the fingerprint sensor by comparing two or more successive outputs from the sensor. The detector can generate a signal at 13 indicative of the detected direction of motion. That signal is input to control processor 3 of the terminal. Control processor 3 then interprets that signal appropriately, as a user input. For example, the control processor 3 may cause motion of a cursor on the display in a corresponding direction to the detected movement.

The mobile terminal of FIG. 1 comprises an antenna 1 connected to a radio interface 2 for transmission and reception of signals from a radio network. A control processor 3 is connected to the radio interface whereby the control processor may provide the radio interface with data for transmission to the network, and may receive data from the network via the radio interface. The control processor is connected to input and output apparatus of the terminal, including keypad 4, fingerprint sensor 5, microphone 6, loudspeaker 7 and visual display 8. The control processor is capable of receiving inputs from the input devices 4, 5 and 6 and providing outputs to the output devices 7 and 8.

Figure 2:
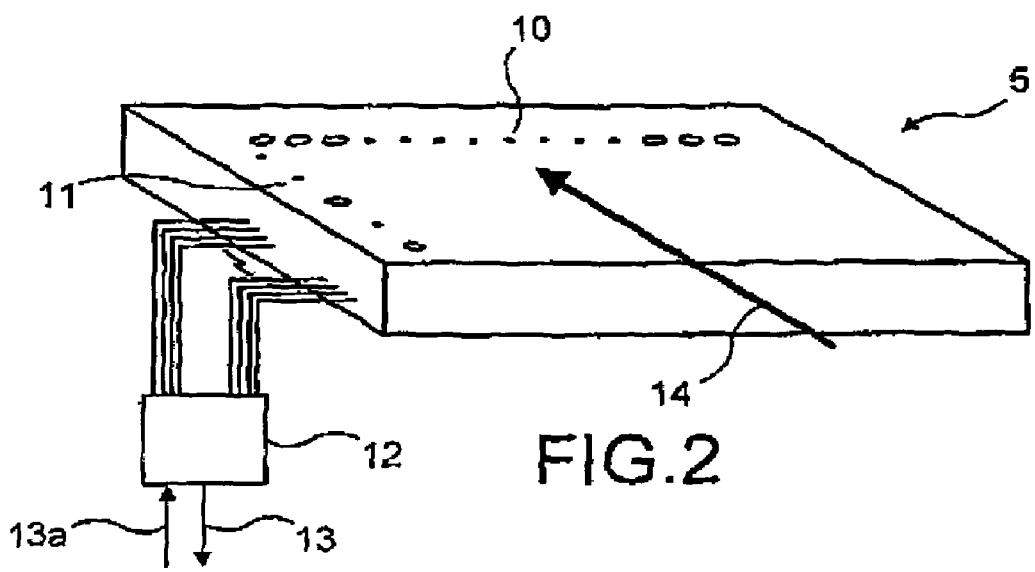
FIG. 2 illustrates a fingerprint sensor.

The fingerprint sensor 5 is shown in more detail in FIG. 2. The sensor comprises a primary linear array 10 of around 256 optical or contact sensors (e.g. sensors 11) located closely together, and a secondary linear array 11 of around 20 less closely spaced sensors disposed orthogonally to the primary array. Each sensor is connected to detector circuitry shown schematically at 12 which can generate an output signal at 13. Output 13 is connected to the control processor 3. The primary array is capable of sensing the detailed shape of a linear section of an object in contact with it by means of the level of light incident on, the degree of contact with, the force on, temperature at or conductivity to each of the sensors of the primary array. The control circuitry is arranged to periodically scan the sensors to receive their outputs and thereby periodically generate an output signal indicative of the surface relief pattern sensed by the primary array. The outputs from the sensors may be sensed digitally as one of a finite number of levels—for example 2, 4, 8 or 16 levels. Successive signals generated in this way can be stored—so as to build up an image of the shape of an object passing over the sensors—or compared, along with data from the secondary array—so as to determine the direction of movement in the plane of the arrays of an object passing over the sensors. Data resulting from the primary array and the secondary array are included in the output signal at 13.

The sensor may be capable of detecting surface relief of an object lying over it and/or that is swept over it.

The fingerprint sensor may be the FingerChip FC15A140 available from Thomson-CSF. Other designs of fingerprint sensor may be used.

In one mode of operation a user can slide his fingertip over the primary array as illustrated at 14 in FIG. 2. The secondary array allows the sliding motion of the user's finger over the array to be detected when successive outputs from the secondary array are compared. By storing successive signals from the primary array as the user's finger slides over the fingerprint sensor, the control processor can build up an image of the user's fingerprint. That image can be stored by the control processor 3 in a memory 9. The stored image can then be checked against subsequent scans for use in authentication of operations of the terminal for security purposes. The period between successive scans may be fixed at around 1.5 ms, for example, or may be dependant on the rate of movement detected by the secondary array as determined at detector circuitry 12. The same principle may be used to scan the surfaces of other objects than fingertips. In this mode of operation the signal at 13 that is output by the detector circuitry comprises information defining the scanned image.

In another mode of operation the fingerprint sensor of the mobile terminal of FIG. 1 can be used in conjunction with detector circuitry 12 and control processor 3 to detect motion of a user's fingertip across the sensor. That motion may be used to help control the user interface of the phone. Successive outputs of the primary and secondary array are taken frequently and compared by detector circuitry 12. The period between successive samples of the arrays may be, for example, 2 ms or less. For greater accuracy more than two successive output scans may be compared. Detector circuitry 12 stores successive outputs. Detector circuitry 12 then analyses successive outputs with the aim of identifying similar features in them. The distance by which such features have moved between the scans in the axis of the primary and secondary arrays can then be determined. Those distances can be combined as vectors to determine the composite direction of motion of the fingertip across the sensor. The rate of movement can also be determined using detector circuitry 12's knowledge of the time between successive scans. The same principle can be used to determine the direction of movement over the sensors of other objects than fingertips. In this mode of operation the signal at 13 that is output by the detector circuitry comprises information defining the direction and rate of movement of the object over the sensor.

The required mode of operation is indicated to the detector circuitry 12 by control processor 3 over connection 13a.

The fingerprint sensor is, of course, capable of detecting surface relief of other body parts or other objects than fingertips. The fingerprint sensor is preferably capable of sensing surface relief digitally. The fingerprint sensor is preferably capable of sensing surface relief at a resolution of less than 0.1 mm, more preferably less then 0.05 mm and most preferably less than 0.01 mm. A preferred sensor pitch is around 50 μm.

FIG. 3 illustrates some modes of operation of the user interface of the mobile terminal.

Figure 3A:
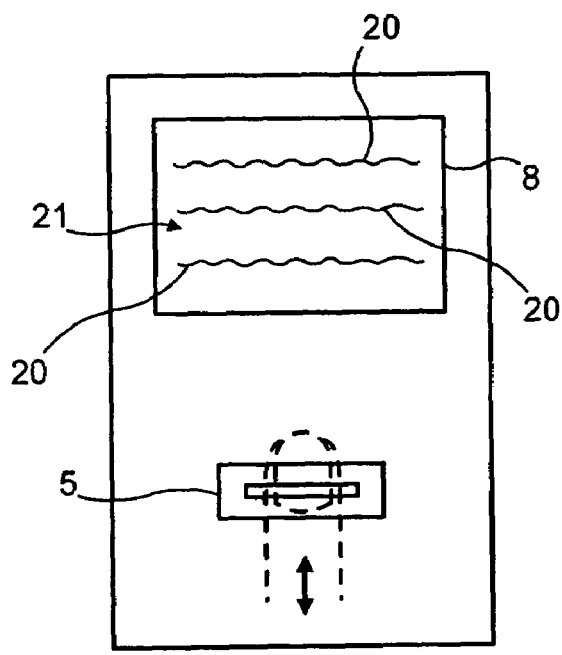
FIG. 3 illustrates modes of operation of a user interface of the mobile telephone of FIG. 1.

In FIG. 3a display 8 of the terminal shows a column listing a number of options 20. A cursor 21 highlights one of the options. In order to select one of the options a user applies inputs to the terminal to cause the cursor to move up or down to another option, or to cause the options to move up and down through the cursor, until the desired option is highlighted. The user then applies an input to the terminal to indicate that the desired option has been highlighted. A similar principle can be used with left/right motion to offer the user a row of options or a two dimensional array of options.

Figure 3B:
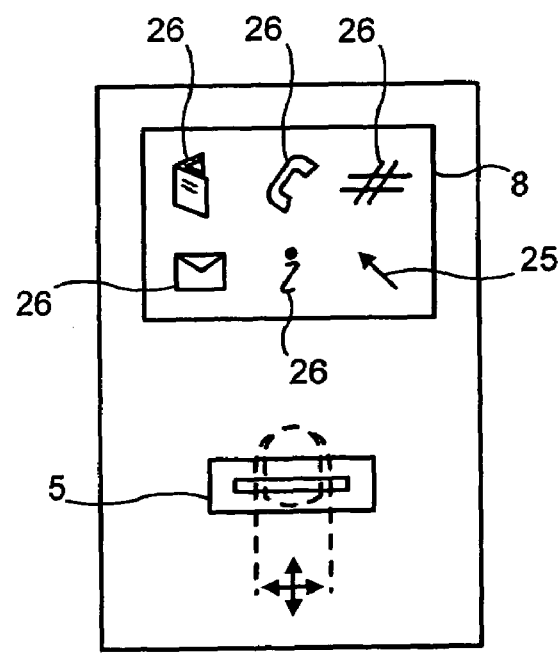

In FIG. 3b display 8 of the terminal shows a cursor 25 and icons 26 distributed in two dimensions Each icon represents an option. In order to select one of the options a user applies inputs to the terminal to cause the cursor to move up, down, left or right until it lies over the icon corresponding to the desired option. The user then applies an input to the terminal to indicate that the desired option has been highlighted.

Figure 3C:
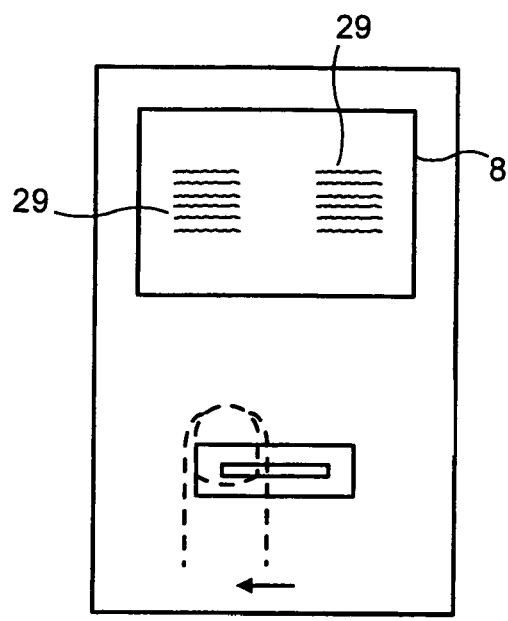

In FIG. 3c display 8 of the terminal shows two options 29: one on the right and the other on the left of the display. The user makes a single input indicating which of those options is desired.

In the mobile terminal of FIG. 1, the fingerprint sensor can be used to help the user to select one of the displayed options. When the user is to select an option the control processor 3 is arranged to show the appropriate image on the display of the mobile terminal. The control processor then signals the detector circuitry 12 to indicate that the circuitry should operate to interpret data from the fingerprint sensor so as to detect motion over the sensor. When such motion is detected by the detector circuitry 12 it is signalled to the control processor 3 to allow the user interface to be controlled in a corresponding manner. For example, in the situation of FIG. 3a, up and down motion across the fingerprint sensor (as illustrated at 32 and 33) may cause the options to scroll correspondingly up or down or the cursor to move correspondingly up or down. In the situation of FIG. 3b, motion across the fingerprint sensor may cause corresponding motion of the cursor (as illustrated at 36 and 37). In the situation of FIG. 3c, leftward motion across the fingerprint sensor may cause the left option to be selected and rightward motion across the fingerprint sensor may cause the right option to be selected. Other arrangements may, of course, be used. In order to improve the usability of the user interface it is preferred that the motion of parts of the image on the display corresponds to the motion detected by the motion sensor, for example by appearing to a user to be the same direction as or otherwise intuitively liked to the detected motion.

Figure 4:
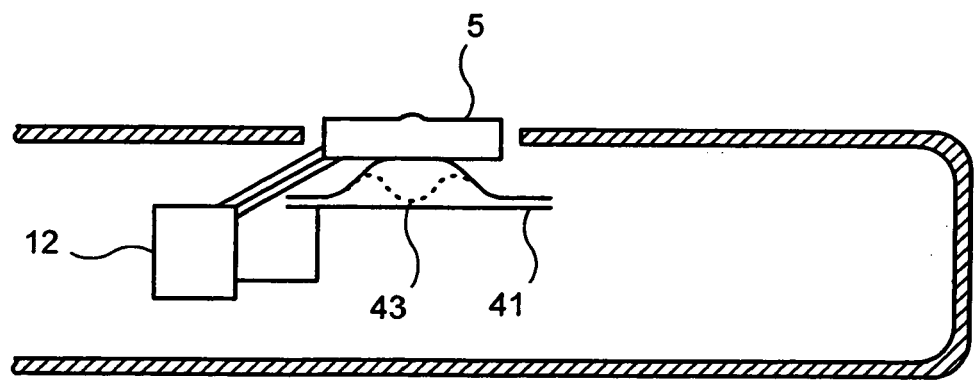
FIG. 4 is a cross-section of a fingerprint sensor.

In some user interface arrangements, for example those of FIGS. 3a and 3b, in addition to making inputs to indicate motion a user must also make an input to indicate selection of an option. One way to permit this is my means of input from a selection button or key on the mobile terminal. Such a button may be part of a normal keypad of the terminal and separate from the fingerprint sensor. Another way to permit this is by means of input, for example a sudden input such as a finger tap, to the fingerprint sensor itself. This may be detected by the fingerprint sensor or by another input device attached to the fingerprint sensor. To detect such input by means of the fingerprint sensor itself the detector circuitry 12 may be arranged to sense a sudden change in the output from the sensor indicative of the sudden application of an object over the sensor and in response thereto to provide a selection signal to the control processor 3. To detect such input by use of another input means the arrangement in FIG. 4 may be used. In FIG. 4 the fingerprint sensor 40 is mounted on a push-switch 41. Sensor 40 and switch 41 provide inputs to detector circuitry 12. When fingerprint sensor 40 is tapped the switch 41 is operated, and in response thereto detector circuitry 12 provides a selection signal to the control processor 3. Switch 41 preferably provides an audible and/or tactile feedback to a user—for example by means of domed membrane 42 which can deform suddenly to the configuration shown at 43 when pressed.

Figure 5:
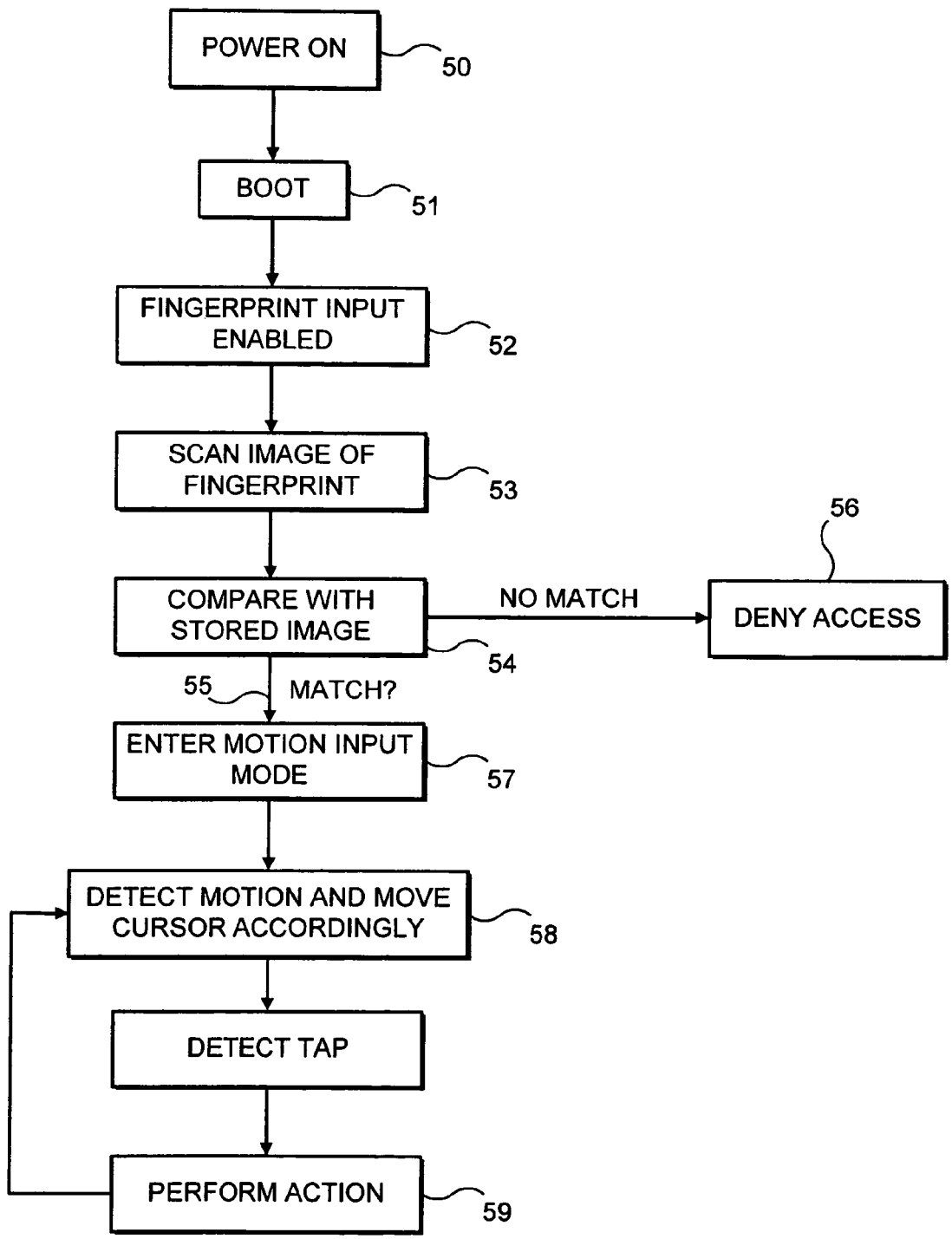
FIG. 5 is a flow diagram showing one example of the operation of the user interface of the mobile telephone of FIG. 1.

FIG. 5 illustrates an example of the operation of the mobile terminal of FIG. 1. At step 50 a user turns on the terminal using power key 33 (FIG. 1). The processing equipment of the terminal is booted up (step 51). The control processor 3 displays a log-in screen on display 8 and signals to the detector circuitry 12 that it should operate in fingerprint input mode (step 52). The user swipes his fingertip over the fingerprint sensor 5. Detector circuitry 12 forms an image of the user's fingerprint from combination of successive signals from the fingerprint sensor and transmits that image to control processor 3 (step 53). Control processor 3 compares that image to a stored image of the authorised user's fingerprint (step 54) and if there is sufficient match allows access to further functions of the terminal (step 55). Otherwise, further access is denied (step 56). The control processor then displays a cursor and icons representing options distributed over display 8 as illustrated in FIG. 3b and signals to detector circuitry 12 that it should operate in motion input mode (step 57). The user moves his finger over the fingerprint sensor in order to move the cursor (by means of detector circuitry 12 and control processor 3) correspondingly until it lies over a desired icon (step 58). The user then lifts his finger off the fingerprint sensor and taps it briefly to indicate selection of that icon, and as a result detector circuitry sends a selection signal to control processor 3 which performs the action associated with that icon (step 59). This process can continue in order to operate the functions of the terminal.

Movement detected by the fingerprint sensor may be interpreted by the control processor in a way that does not cause corresponding movement of an item on the display. For example, up and down motion over the fingerprint sensor during a terminal call could cause the earpiece volume of the terminal to increase or decrease respectively.

The fingerprint sensor may be supplemented by other means of user input to the control processor. Additional input means could include a keypad, for instance including numeric keys for dialing purposes, and/or a microphone for receiving voice input from a user. The voice input could be for input of speech during voice terminal calls and/or for voice activation of options if the mobile terminal is equipped with voice recognition apparatus.

The operating methods and apparatus described above can be applied to equipment other than mobile terminals.

One notable advantage of the input arrangement described above is that because the fingerprint sensor is capable of sensing the relief of an object (especially the small scale surface relief of an object) it allows for an especially compact motion input device. The above input arrangement can be contrasted in particular to a touchpad. A touchpad is capable of sensing motion of an object only within the boundaries of the touchpad; therefore the touchpad must be large enough to accommodate such movement. In the above arrangement, because the surface relief of an object moving across the sensor can be sensed, the sensor can be of comparatively small size. Thus unlike with a touchpad the input arrangement of the present invention is not limited to providing motion detection principally in dependence on the location of an object on the sensor—in contrast, motion detection is essentially independent of the location of an object on the sensor, and dependant on the detected motion of its surface relief across the sensor. The present invention is therefore particularly advantageous when applied to equipment that is of small size, such as user portable equipment.

Another notable advantage of the above input arrangement is that the sensor may be used for reading of fingerprints (or other body parts) as well as sensing motion. The sensor and its associated circuitry may therefore have a security function as well as a more conventional input function. The present invention is therefore especially advantageous when applied to equipment that is preferred to have a degree of security, when the fingerprint sensor can provide a means of allowing relative security of access to the functions of the equipment. Such equipment may be equipment that is capable of making a debit to a users account and/or equipment that provides access to confidential information. Examples of equipment to which the present invention may be applied include cameras, person computers, personal organisers, cash dispensers and door entry systems.

Another point to note is that the above input arrangement is capable of sensing a rotating motion of a finger or the like over the sensor. This could usefully provide convenient data input, especially in conjunction with a corresponding visual display, for example to simulate turning of a key in a lock as the user's finger rotates substantially about a point.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

What is claimed is:

1. A user input device comprising:
   a sensor capable of sensing surface relief of human skin comprising:
   a plurality of sensing units arranged in a substantially planar array such that the sensor comprises a first sensing section comprising a linear array of sensing units extending in a first direction and a second sensing section comprising a linear array of sensing units extending in a second direction, wherein the sensing units are more closely spaced in the first direction than in the second direction;
   the user input device further comprising:
   a movement detector responsive to variation of the output of the sensor for detecting movement of skin over the sensor; and
   user interface apparatus responsive to the movement detector to alter its state in correspondence to the detected movement;
   wherein the movement detector is operable to compare successive outputs from the first sensing section to detect movement in the first direction and to compare successive outputs from the second sensing section to detect movement in the second direction; the movement detector being further operable to determine a composite direction of movement across the sensor from a combination of the detected movement in the first direction and the detected movement in the second direction.

2. A device as claimed in claim 1, wherein the sensing units are optical sensing units.

3. A device as claimed in claim 1, wherein the sensor is a finger print sensor.

4. A device as claimed in claim 1, wherein the movement detector is responsive to variation of the output of the sensor for determining the direction of movement of skin across the sensor.

5. A device as claimed in claim 1, including storage apparatus capable of storing successive outputs from the sensor in a memory so as to form a record of the surface relief of skin drawn across the sensor.

6. A device as claimed in claim 1, wherein the user interface apparatus includes a display and a display controller capable of controlling the display so as to cause at least part of an image to move across the display in correspondence to detected movement across the sensor.

7. A device as claimed in claim 6, wherein the display controller is capable of controlling the display so as to cause the said at least part of an image to move across the display in apparently the same direction as the detected movement across the sensor.

8. A device as claimed in claim 1, wherein the sensor is capable of sensing relative rotation of skin and the sensor.

9. A communication terminal comprising a user input device as claimed in claim 1.

10. A method of operation in a user input device comprising a sensor capable of sensing surface relief of human skin, wherein the sensor comprises a plurality of sensing units arranged in a substantially planar array such that the sensor comprises a first sensing section extending in a first direction and a second sensing section extending in a second direction, wherein the sensing units are more closely spaced in the first direction than in the second direction, the method comprising:
   detecting movement of skin over the sensor; and
   altering the state of user interface apparatus in response to the detected movement
   wherein detecting movement of skin over the sensor further comprises:
   comparing successive outputs from the first sensing section to detect movement in the first direction;
   comparing successive outputs from the second sensing section to detect movement in the second direction; and
   determining a composite direction of movement across the sensor from a combination of the detected movement in the first direction and the detected movement in the second direction.

* * * * *